July 8, 1941.　　　A. F. MILLER　　　2,248,479
CUP DISPENSING APPARATUS
Filed Jan. 30, 1940　　　2 Sheets-Sheet 2
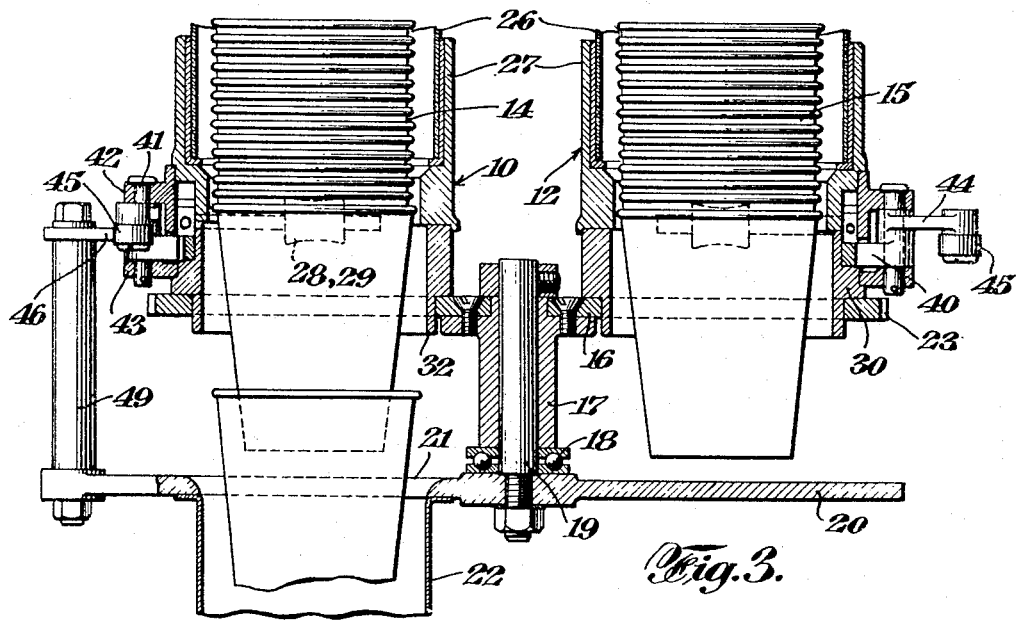
Fig.3.
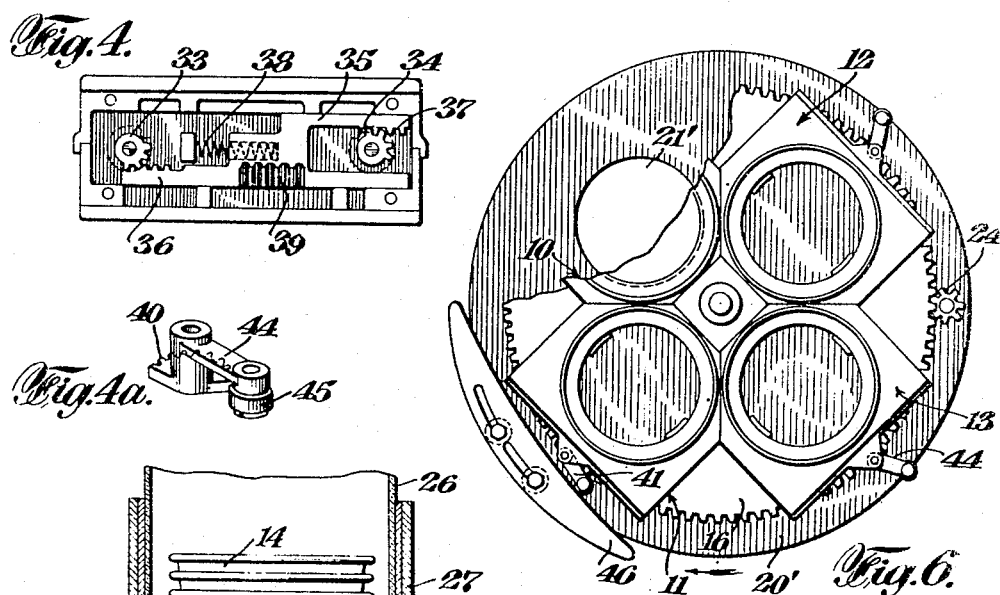
Fig.4.
Fig.4a.
Fig.6.
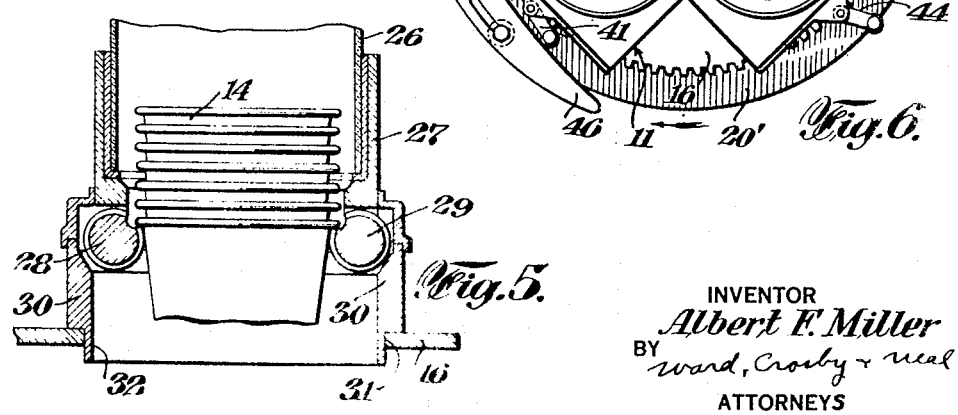
Fig.5.
INVENTOR
Albert F. Miller
BY Ward, Crosby & Neal
ATTORNEYS Patented July 8, 1941

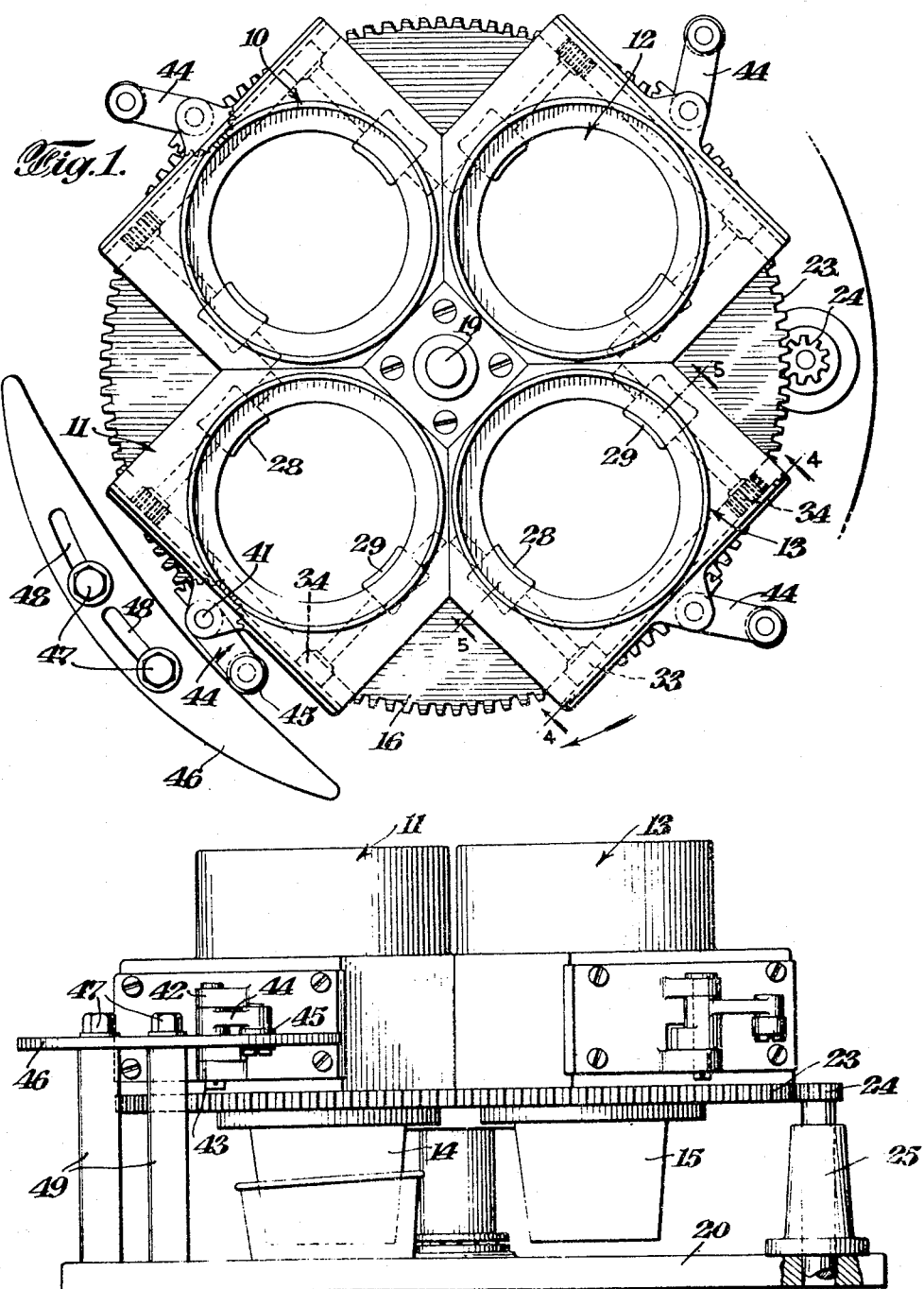

2,248,479

UNITED STATES PATENT OFFICE 2,248,479

CUP DISPENSING APPARATUS

Albert F. Miller, Flushing, N. Y., assignor to Lily-Tulip Cup Corporation, New York, N. Y., a corporation of Delaware Application January 30, 1940, Serial No. 316,293

3 Claims. (Cl. 312—44)

This invention relates to apparatus for dispensing paper cups or the like articles.

As is well known, paper cups as used in retail beverage dispensing establishments, are provided in stacks. A convenient number, for example 100, of the cups being thus nested together, are placed in a dispensing device such for example as of the type disclosed in the patent to Reifsnyder No. 1,703,637, granted February 26, 1929, whereby the cups may be dispensed one by one, the remainder of the stack remaining supported and housed within the device. If the cups are used quite rapidly, it is necessary for the distributor to service such devices quite frequently to refill the same with cups, or else the proprietor of the establishment must keep on hand additional stacks of cups, which is sometimes inconvenient and the extra supplies of cups may be exposed to injury or dirt pending their insertion in the dispensing device.

With the present invention a dispensing apparatus is provided in such form as to contain a plurality of the stacks of cups which may all be inserted at one time, or the device may be conveniently refilled with a sufficient number of cups at any time so that the person distributing the cups, has to service the device only at relatively infrequent intervals. And meanwhile the whole supply of cups is kept enclosed and protected in the device and the retailer does not need to be concerned with opening and refilling the device with additional stacks of cups, or with the storage of additional cups elsewhere in his place of business. The invention also provides an apparatus from which cups may be dispensed one at a time in succession respectively from each of the several stacks of cups in the device, so that all of the remaining stacks in the device may be of uniform height, evenly balanced, and of attractive appearance. The apparatus is particularly well adapted for dependable use with automatic or semi-automatic beverage dispensing equipment and will insure that each time the equipment is operated, a single cup will be dispensed in proper position to receive the liquid. Since the several stacks of cups in the device are used automatically in succession, no special mechanism or attention of the operator is required to shift from one stack to another, as would be the case if each stack were completely used before using the next stack.

Various further and more specific objects, features and advantages will clearly appear from the detailed description given below, taken in connection with the accompanying drawings which form a part of this specification and illustrate by way of example preferred forms of the invention. The invention consists in such novel features, arrangements and combinations of parts as may be shown and described in connection with the apparatus herein disclosed.

In the drawings,

Fig. 1 is a plan view of a preferred form of apparatus embodying the invention;

Fig. 2 is a side elevational view of the same;

Fig. 3 is a vertical sectional view;

Fig. 4 is a view taken substantially along the line 4—4 of Fig. 1;

Fig. 4a is a perspective view showing certain details of the construction;

Fig. 5 is a sectional view taken substantially along the line 5—5 of Fig. 1; and Fig. 6 is a plan view partially broken away of an alternative embodiment of the apparatus.

Referring to Fig. 1 of the drawings in further detail, a plurality of paper cup dispensing devices are shown respectively at 10, 11, 12 and 13, each of such devices being adapted to contain and support a vertical stack of cups nested together in upright position, for example 100 cups in each stack, positioned in a manner such as indicated in Fig. 3 at 14 and 15. Each of the dispensing devices 10 to 13 inclusive may for example be constructed and may operate per se in a manner similar to the dispensing device of the above mentioned patent, but with certain exceptions hereinafter explained. Also as indicated in Fig. 1, these dispensing devices are preferably so shaped that they may be compactly positioned side by side around a circle or otherwise, in such a manner that the devices may be moved in a circuitous path whereby the lower portion of each stack of cups in succession passes the point of discharge.

As shown in Fig. 3, the dispensing devices 10 to 13 inclusive may all be supported upon a gear wheel as at 16, secured to a rotatable post 17, which in turn may rotate on ball bearings as at 18 around a stub shaft 19 fixed to a supporting plate 20. The supporting plate 20 may be formed with a discharge orifice as at 21 at which a depending outlet conduit 22 is fixed for guiding the cups either to a desired position in the automatic dispensing equipment or to any other desired point. As shown in Figs. 1 to 3, the periphery of the gear wheel 16 may be provided with gear teeth as at 23, adapted to be engaged by a pinion as at 24, which pinion may be either operated by a hand crank or by a power driven shaft as at 25 in case the device is to be operated in connection with automatic dispensing equipment. Thus a turret-like construction is provided for rotatably mounting the several stacks of cups so that the lower portion of each stack in succession may be brought to a position for discharging a cup through the outlet 21. The rotation of this turret structure may be step by step, as the cups are required, or continuous in case a continuous series of cups are to be filled automatically.

While in the particular construction shown, four of the dispensing units as at 10 to 13 inclusive are illustrated, it will be apparent that a greater or lesser plurality may be provided for operation in the same manner as herein explained.

Each of the dispensing units may comprise an upstanding tubular glass member as at 26, closed at its top in the usual manner, these members being slidably removable from supporting frames as at 27 to permit insertion of stacks of cups. As shown in Fig. 5, a pair of cam members as at 28 and 29 may be mounted for rotation on horizontal axes respectively at each side of the flange of the lowermost cup of each stack. These cam members may be housed in a suitable supporting structure as at 30, mounted in turn upon the gear wheel 16, such wheel being formed with suitable apertures as at 31 for receiving annular flanges as at 32 formed at the bottom of the members 30.

As shown more clearly in Fig. 4, the cam members 28 and 29 at one side of the device, may have sector gears as at 33 and 34 affixed thereto. For operating these sector gears a longitudinally slidable bar 35 may be provided, having two sets of rack teeth as at 36 and 37 for respectively engaging the teeth of sector gears 33 and 34. Thus when the bar 35, for example, in Fig. 4 slides toward the left, the cam member 28 as viewed in Fig. 5 will be rotated in a clockwise direction, and the cam 29 in a counter clockwise direction simultaneously in such manner as to engage the rim of the lowermost cup and separate such cup from the stack, while continuing to support the remainder of the stack. Movement of the bar 35 toward the right, which may be accomplished by a restoring spring as at 38, will result in restoring the cams 28 and 29 to their former positions ready for the next actuation to dispense the next cup from the stack. Further details as to the construction and mode of operation of these portions of the apparatus per se may be had by reference to the above mentioned Patent No. 1,703,637. However, instead of operating said bar 35 by a push rod as in said patent, the same may be preferably operated for the purposes of the present invention by forming along the bar an additional series of rack teeth as at 39. These teeth are adapted to engage the teeth of a sector gear as at 40 (Fig. 4a). The latter gear may be rotatably mounted on a shaft as at 41, carried in supporting lugs as at 42 and 43 (Fig. 3), these lugs being formed on a removable cover plate for the mechanism of Fig. 4. An actuating lever as at 44 may be fixed in respect to the sector gear 40 and provided at its outer end with a rotatable member 45 or other antifriction device for engaging a cam 46. The cam 46 which is more fully shown in Fig. 1, may be normally fixed in position although adjustable for endwise movement, as by screws 47 passing through slots as at 48, into supporting posts as at 49.

The cam 46 as shown in Fig. 2 may be mounted at a position to extend along the region adjacent the cup outlet 21. That is, this cam may be adjusted at such a position that it will cause each of the cup dispensing units to actuate and dispense a cup from the corresponding stack when such stack reaches a position over the cup outlet, and so that the cup will be freed to fall therethrough.

In some cases it may be found preferable to discharge the cups from each dispensing unit respectively at a point for example, 90° in advance of the cup outlet (in case four of the dispensing units are provided). Such an arrangement is shown in Fig. 6, which may be the same as the arrangement above described except that the cup outlet 21' is located at a position such that when a cup is dispensed from the unit 11, for example, by the action of the cam 46, such cup will first fall on to the supporting plate 20'. Then as the turret structure revolves, such separated or partially separated cup will be slid along the supporting plate by the lower cup of the remaining stack, until it arrives at the outlet 21', whereupon it will be discharged. In some cases this arrangement may insure a more rapid dispensing operation in response to the operation of the turret structure, and will also render unnecessary any precise adjustment of the position of cam 46, or readjustment thereof after any of the parts may have become worn.

While the invention has been described in detail as used with dispensing units of the type disclosed in the above mentioned Reifsnyder patent, it will be understood that various features of the invention may also be used in connection with other types of units for dispensing cups or the like, for example such as shown in the patent to Nias, No. 1,272,701, granted July 16, 1918.

While the invention has been described in detail with respect to particular preferred examples, it will be understood by those skilled in the art after understanding the invention that various changes and modifications may be made without departing from the spirit and scope of the invention, and it is intended therefore in the appended claims to cover all such changes and modifications.

What is claimed as new and desired to be secured by Letters Patent is:

1. Apparatus for dispensing paper cups or the like, comprising a supporting structure for a plurality of side-by-side and generally vertical stacks of the nested cups, said supporting structure being constructed for moving each of the stacks in a circuitous path in succession past a discharge point, with the lowermost remaining cups suspended in upright position from beneath each stack, a mechanism at the base of each stack for sufficiently separating upon each actuation, an individual cup from the stack, so that it is free to fall from the stack, said mechanisms each having a protruding operating lever, and cam means adjacent said path for engaging and operating said levers in succession as the stacks advance past the latter means.

2. Apparatus for dispensing paper cups or the like, comprising a structure for supporting a plurality of generally vertical stacks of the nested cups, the stacks being arranged around a circle, a gear wheel on said structure, concentric with such circle and having its teeth at the periphery of the structure, means for engaging said wheel to rotate the structure, a mechanism at the base of each stack for sufficiently separating upon each actuation, an individual cup from the stack, so that it is free to fall from the stack, and means for actuating said mechanisms in succession as each corresponding stack passes a predetermined position on its path.

3. In apparatus of the character described, the combination of a container for a stack of nested cups, horizontally swiveled devices arranged on opposite sides of the cups for engaging the cups to dispense them, and means for synchronously operating said devices comprising a bar slidingly arranged at one side of the axis of said container and having an upper rack member geared to one of said devices and a lower rack member geared to the other device, said rack members being respectively above and below the axes of said devices, a spring for automatically returning said bar to its normal position, an additional rack along said bar, a sector gear for engaging the latter rack to longitudinally move said bar and thereby actuate the apparatus, and means connected to said sector gear and protruding therefrom for operating same.

ALBERT F. MILLER.